United States Patent
Sasaki et al.

(10) Patent No.: US 8,349,446 B2
(45) Date of Patent: *Jan. 8, 2013

(54) COATED STEEL SHEET

(75) Inventors: Motohiro Sasaki, Tokyo (JP); Koichi Saito, Tokyo (JP); Atsushi Morishita, Chiba (JP); Akira Takahashi, Chiba (JP)

(73) Assignees: Nippon Paint Co., Ltd., Osaka (JP); Nippon Steel Corporation, Tokyo (JP)

( * ) Notice: Subject to any disclaimer, the term of this patent is extended or adjusted under 35 U.S.C. 154(b) by 343 days.

This patent is subject to a terminal disclaimer.

(21) Appl. No.: 12/303,195

(22) PCT Filed: Jun. 15, 2006

(86) PCT No.: PCT/JP2006/312052
§ 371 (c)(1), (2), (4) Date: Mar. 27, 2009

(87) PCT Pub. No.: WO2007/144950
PCT Pub. Date: Dec. 21, 2007

(65) Prior Publication Data
US 2010/0233470 A1     Sep. 16, 2010

(51) Int. Cl.
B32B 5/16      (2006.01)
B32B 15/08     (2006.01)

(52) U.S. Cl. ........................................... 428/327

(58) Field of Classification Search .................. None
See application file for complete search history.

(56) References Cited

FOREIGN PATENT DOCUMENTS

| JP | 6-321543 A | 11/1994 |
|---|---|---|
| JP | 8-143314 A | 6/1996 |
| JP | 8-325018 A | 12/1996 |
| JP | 10-15484 A | 1/1998 |
| JP | 11-71536 A | 3/1999 |
| JP | 11-268178 A | 10/1999 |
| JP | 2000-273659 A | 10/2000 |
| JP | 2001294630 A | * 10/2001 |
| JP | 2002-322212 A | 11/2002 |
| JP | 2003-155451 A | 5/2003 |
| JP | 2005-281863 A | 10/2005 |
| JP | 2006-96902 A | 4/2006 |

OTHER PUBLICATIONS

Machine translation of JP 2003-155451.*
Machine translation of JP 2001-294630.*
Nissan Chemical (Colloidal Silica Product information, available at www.nissachem-usa.com/snowtex.php).*
Machine translation of JP 2003-155451 (Published in japanese on May 30, 2003).*
Machine translation of JP 2001-294630 (Published in japanese on Oct. 23, 2001).*
Nissan Chemical (Colloidal Silica Product Information, available at www.nissachem-usa.com/snowtex.php) (Retrieved from the web on Sep. 28, 2011).*
European Search Report dated Jun. 30, 2010, issued in corresponding European Patent Application No. 06757350.1.
International Search Report of PCT/JP2006/312052, date of mailing Aug. 15, 2006.
Japanese Office Action dated Aug. 23, 2011, issued in corresponding Japanese Patent Application No. 2008-521062.

* cited by examiner

*Primary Examiner* — Mark Ruthkosky
*Assistant Examiner* — Alexandre Ferre
(74) *Attorney, Agent, or Firm* — Westerman, Hattori, Daniels & Adrian, LLP

(57) ABSTRACT

A coated steel sheet coated with a composite coat,
wherein said composite coat is a coat formed by compounding ethylene-unsaturated carboxylic acid copolymerization resin particles (A) having an average particle diameter of 20 to 100 nm and a silanol group and/or an alkoxysilyl group, silicon oxide particles (B) having an average particle diameter of 5 to 50 nm and an organic titanium compound (C), and
wherein an amount of a coat of said composite coat is 0.5 to 3 g/m$^2$.

4 Claims, 1 Drawing Sheet

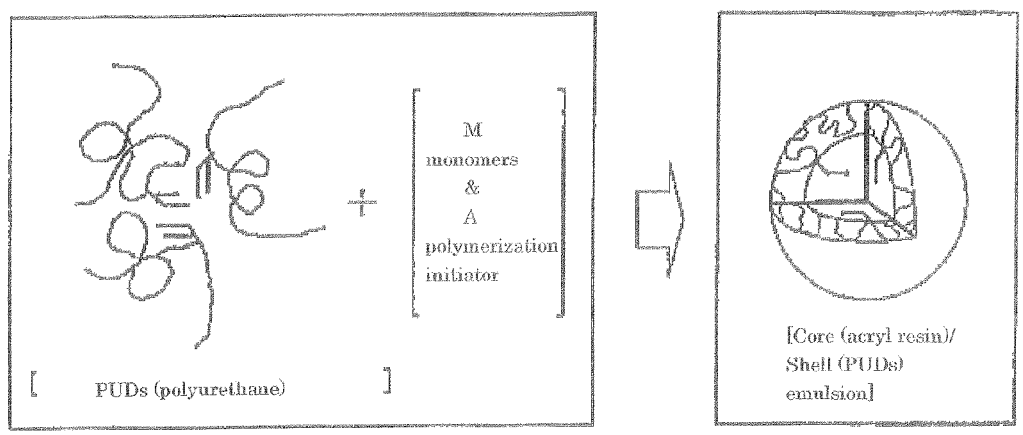

COATED STEEL SHEET

TECHNICAL FIELD

The present invention relates to a coated steel sheet.

BACKGROUND ART

Hitherto, to steel materials such as a zinc-plated steel sheet, an aluminum-plated steel sheet and the like, a rust prevention treatment by chromate, which uses hexavalent chromate, has been widely applied, and theses steel materials have been coated with an organic resin and then top coated with various coating compositions in order to provide an anti-fingerprint property and an anti-scratch property as required.

In recent years, there are moves to regulate or prohibit chromate treatments which hitherto have been applied to steel materials by a law against the background of increasing environmental issues. Since a chromate treated layer in itself has a high degree of corrosion resistance and an adhesion property to a paint, if this chromate treatment cannot be performed, these properties will be significantly deteriorated. Accordingly, it has been desired to form a rust preventing layer having good corrosion resistance and a good adhesion property to a paint without carrying out a chromate treatment.

In Japanese Kokai Publication Hei11-71536, there is described a coated steel sheet treated with a rust prevention treatment agent for metal surfaces in which silica and an epoxy compound are contained in a reaction product of an ionomer resin neutralized with a bivalent metal and an epoxy compound. This coated steel sheet provides an improvement in adhesion to curable resins such as coating compositions. However, a coat of this coated steel sheet has low adhesion to metal material and particularly under the wet condition, water permeates through the coat and reaches the interface between the coat and the metal material and therefore the coat is peeled off.

In Japanese Kokai Publication 2000-273659, there is described a coated steel sheet treated with a rust prevention treatment agent for metal surfaces in which silica, an epoxy compound, a silane coupling agent and thiosulfate ion are mixed in a reaction product of an ionomer resin neutralized with a monovalent metal and a bivalent metal, a polyolefin resin neutralized with amine and an epoxy compound. In such a coated steel sheet, alkali resistance and an adhesion property to a paint are more improved than that in the coated steel sheet in Japanese Kokai Publication Hei11-71536 according to how much the silane coupling agent are post-added. But, the adhesion to metal material is insufficient.

In Japanese Kokai Publication 2003-155451, a coated steel sheet treated with a water-borne coating agent into which a water-dispersible resin, silica particles and an organic titanium compound are mixed is described. However, this coated steel sheet may be insufficient in properties of an adhesion property to a substrate and press oil resistance of a coat, and a coated steel sheet, performance of which is further improved, is required.

In Japanese Kokai Publication 2005-281863, a coated steel sheet, which is provided with a coat containing a crosslinked resin matrix and an inorganic rust preventive agent, is described.

DISCLOSURE OF THE INVENTION

In view of the above-mentioned state of the art, it is an object of the present invention to provide a coated steel sheet, properties of which such as an adhesion property to a substrate and press oil resistance are improved.

The present invention pertains to a coated steel sheet coated with a composite coat,
wherein said composite coat is a coat formed by compounding ethylene-unsaturated carboxylic acid copolymerization resin particles (A) having an average particle diameter of 20 to 100 nm and a silanol group and/or an alkoxysilyl group, silicon oxide particles (B) having an average particle diameter of 5 to 50 nm and an organic titanium compound (C), and
wherein an amount of a coat of said composite coat is 0.5 to 3 g/m$^2$.

In the composite coat, an amount of the silicon oxide particle (B) is preferably 5 to 100% by mass with respect to that of the resin particle (A) and the content of a titanium atom is preferably 0.05 to 3% by mass with respect to the total amount of a coat.

The composite coat is preferably a coat formed by further compounding at least one compound (D) selected from the group consisting of phosphate compounds, thiocarbonyl compounds, niobium oxide and guanidine compounds in addition to the substances (A), (B) and (C).

Hereinafter, the present invention will be described in detail.

The coated steel sheet of the present invention has a coating formed by compounding the ethylene-unsaturated carboxylic acid copolymerization resin particles (A) having an average particle diameter of 20 to 100 nm and a silanol group and/or an alkoxysilyl group, the silicon oxide particles (B) having an average particle diameter of 5 to 50 nm and the organic titanium compound (C). The above-mentioned coat formed by compounding the above substances (A), (B) and (C) is superior in the properties of corrosion resistance, solvent resistance, alkali resistance and an adhesion property to a paint. Particularly by using resin particles having an average particle diameter of 20 to 100 nm as the resin particles (A), the uniformity and the compactness of a coat are enhanced and therefore there are outstanding improvements in an adhesion property to a substrate and press oil resistance.

The above-mentioned resin particle (A) includes, for example, a resin particle obtained by reacting a water dispersion of resin, which is prepared by neutralizing a copolymerization resin of ethylene and unsaturated carboxylic acid such as acrylic acid, methacrylic acid or maleic anhydride with hydroxide of alkali metal such as sodium hydroxide, potassium hydroxide and the like or an aqueous ammonia or organic amines and dispersing the resulting neutralized product in water, with a silane compound. Among others, a resin particle obtained by reacting a water dispersion of resin of the ethylene-methacrylic acid copolymerization resin neutralized with a base with a silane compound is preferred in that a finer particle can be obtained and a high-performance coat can be formed.

The above-mentioned ethylene-methacrylic acid copolymerization resin preferably has a methacrylic acid content of 10 to 30% by mass. This copolymerization resin may contain a monomer other than methacrylic acid as required but an amount of the monomer to be used is preferably 10% by mass or less. The above ethylene-methacrylic acid copolymerization resin can be produced by a publicly known method such as a method of polymerization by production equipment of high pressure processed low density polyethylene.

The above resin particle (A) has the silanol group and/or the alkoxysilyl group. By having the above functional groups, the resin particle (A) can initiate a reaction with the silicon oxide particle (B) and the organic titanium compound (C) to form a composite coat and can improve the adhesion property to a substrate and the press oil resistance. The above-mentioned alkoxysilyl group is not particularly limited and includes, for example, a trimethoxysilyl group, a dimethoxysilyl group, a methoxysilyl group, a triethoxysilyl group, a diethoxysilyl group, and an ethoxysilyl group. The above-mentioned functional group can be obtained by reacting a silane compound with a water dispersion of the above ethylene-unsaturated carboxylic acid copolymerization resin. The above-mentioned silane compound is preferably an epoxy group-containing silane compound.

Specific examples of compounds to be used as the above-mentioned epoxy group-containing silane compound include 3-glycidoxypropyltrimethoxysilane, 3-glycidoxypropylmethyldimethoxysilane, 3-glycidoxypropyltriethoxysilane, 3-glycidoxypropylmethyldiethoxysilane, and 2-(3,4-epoxycyclohexyl)ethyltrimethoxysilane. These compounds may be used alone or in combination of two or more species thereof. As for an amount of the above silane compound to be mixed, the above-mentioned epoxy group-containing silane compound is preferably mixed in an amount 0.1 to 30% by mass with respect to the solid matter of the above water dispersion of resin. The silane compound is more preferably mixed in an amount 1 to 10% by mass with respect to the solid matter of the water dispersion of resin. When this amount of the silane compound to be mixed is less than 0.1% by mass, the alkali resistance, the solvent resistance and the adhesion property to a paint formed on the surface of a steel material are deteriorated, and when it is more than 30% by mass, the affinity for water of a composite coat becomes too large and therefore corrosion resistance may be deteriorated or the solution stability of a water-borne coating agent to be used for forming a composite coat may be deteriorated.

The reaction of the water dispersion of resin with the above silane compound may be performed in combination with an epoxy compound. When the epoxy compound is used in the composite coat in combination, the affinity of the composite coat for organic resins is enhanced and therefore this composite coat may be advantageous for improving an adhesion property to a paint film in the case of applying a finishing paint. The above-mentioned epoxy compound includes sorbitol polyglycidyl ether, pentaerythritol polyglycidyl ether, glycerol polyglycidyl ether, diglycerol polyglycidyl ether, propylene glycol diglycidyl ether, triglycidyl tris(2-hydroxyethyl)isocyanurate, bisphenol A glycidyl ether and hydrogenated bisphenol A diglycidyl ether. These compounds may be used alone or in combination of two or more species thereof.

The above-mentioned resin particles (A) have an average particle diameter of 20 to 100 nm. Here, the average particle diameter can be measured by a particle size measuring apparatus based on a dynamic light scattering method, e.g., FPAR-1000 (manufactured by OTSUKA ELECTRONICS CO., LTD.). The value of the above-mentioned average particle diameter is a value of a cumulant average particle diameter obtained by diluting a water dispersion of the resin particle (A) to the concentration that is suitable for measurement by the above measuring apparatus with ion-exchange water and measuring the diluted water dispersion at 25° C. When the average particle diameter measured by the above-mentioned method is less than 20 nm, a problem that workability and corrosion resistance are deteriorated because a coat has high viscosity and a too large affinity for water arises. When the average particle diameter is more than 100 nm, a problem of the deterioration of an adhesion property to a substrate and press oil resistance arises in coat performance.

An average particle diameter of the above resin particles (A) can be held within the above range by adjusting species of a neutralizer, conditions of dispersing in water, species of a silane compound, reaction conditions of a silane compound, species of an epoxy compound, and reaction conditions of an epoxy compound. As the species of a neutralizer, an alkali metal is preferably used in order to make an average particle diameter smaller, and when amine or ammonia is used, it is preferred to use it in combination with the alkali metal. As the conditions of dispersing in water, such conditions that the dispersion is carried out at a high stirring rate at elevated temperatures immediately before boiling for a long time are preferred. A desired particle diameter can be attained, for example, by dispersing at a rotation speed of 500 rpm/minute or more over 4 hours or more. The silane compound and the epoxy compound are preferably not insoluble in water and low molecular weight compounds, and the reaction of the silane compound and the epoxy compound are preferably performed under the heating condition.

As the above-mentioned silicon oxide particle (B), a particle having an average particle diameter of about 5 to 50 nm is suitable, and the silicon oxide particle (B) can be appropriately selected from colloidal silica and fumed silica to be used. Specific examples include SNOWTEX-N, SNOWTEX-C (produced by NISSAN CHEMICAL INDUSTRIES, LTD.), ADELITE AT-20N, ADELITE AT-20A (produced by Asahi Denka CO., LTD.), and CATALOID S-20L, CATALOID SA (produced by Catalysts & Chemicals Industries Co., Ltd.). These silicon oxide particles may be used alone or in combination of two or more species thereof.

Specific examples of compounds to be used as the above-mentioned organic titanium compound (C) include dipropoxybis(triethanolaminato)titanium, dipropoxybis(diethanolaminato)titanium, dibutoxybis(triethanolaminato)titanium, dibutoxybis(diethanolaminato)titanium, dipropoxybis(acetylacetonato)titanium, dibutoxybis(acetylacetonato)titanium, dihydroxybis(ammonium lactato)titanium, dihydroxybis(diammonium lactato)titanium, propanedioxytitaniumbis(ethylacetoacetate), oxotitaniumbis(monoammonium oxalate), and isopropyltri(N-amidethylaminoethyl)titanate. These compounds may be used alone or in combination of two or more species thereof.

The above composite coat is a coat in a state in which the resin particles (A), the silicon oxide particles (B) and the organic titanium compound (C) are combined with one another. That is, this is a state in which a functional group in the surface of the resin particle, a functional group in the surface of the silicon oxide particle and a functional group in the organic titanium compound (C) form the combinations and are compounded.

The above-mentioned combination is a combination formed by a reaction primarily of a Si—OR group and/or a Si—OH group of the resin particle (A), a Si—OH group at the surface of the silicon oxide particle (B) and a Ti—OR' group and/or a Ti—OH group of the organic titanium compound (C), and these combinations are assumed to be a Si—O—Si bond, a Si—O—Ti—O—Si bond and the like. By these bonds, an advantageous effect that an organic resin particle forms a chemically strong combination with an inorganic particle is attained. Further, because the particle sizes of the resin particle (A) and the silicon oxide particle (B) are within specific ranges, the above-mentioned bonds between particles are formed in high density in the above composite coat and therefore the composite coat become a chemically stable coat having high microscopic homogeneity. Therefore, it is assumed that particularly outstanding effects are attained.

The above composite coat may be a coat formed by compounding further at least one compound (D) selected from the group consisting of phosphate compounds, thiocarbonyl compounds, niobium oxide and guanidine compounds. This means that two or more species of the phosphate compound, the guanidine compound, the thiocarbonyl compound and the niobium oxide may be mixed or any one species of these compounds may be mixed. That is, this means that in the above composite coat, at least one species selected from the group consisting of phosphate compounds, thiocarbonyl compounds, niobium oxide and guanidine compounds may be further compounded in addition to essential components of the resin particle (A), the silicon oxide particle (B) and the organic titanium compound (C).

The above-mentioned phosphate compound includes phosphoric acids such as orthophosphoric acid, metaphosphoric acid, pyrophosphoric acid, triphosphoric acid and tetraphosphoric acid, and phosphates such as triammonium phosphate, diammonium hydrogen phosphate, trisodium phosphate and disodium hydrogenphosphate. These phosphate compounds may be used alone or in combination of two or more species thereof. When the above phosphate compound is used, a phosphate ion forms a phosphate layer on the surface of a metal base to passivate the metal and a rust preventing property can be improved.

The thiocarbonyl compound, the niobium oxide and the guanidine compound are particularly effective for the prevention of white rust of a galvanized steel sheet as with chromium compounds which have been previously used for providing the corrosion resistance.

The above-mentioned thiocarbonyl compound is expressed by the following general formula (1):

wherein X and Y are the same or different from each other, and represent H, OH, SH or $NH_2$, or a hydrocarbon group having 1 to 15 carbon atoms, optionally having OH, SH or $NH_2$ as a substituent and containing —O—, —NH—, —S—, —CO— or —CS—, and X and Y are optionally combined with each other to form a ring.

The thiocarbonyl compound expressed by the above general formula (1) refers to a compound having a thiocarbonyl group expressed by the following formula (I):

among thiocarbonyl groups, a preferred one is a thiocarbonyl group having a nitrogen atom or an oxygen atom, expressed by the following formula (II):

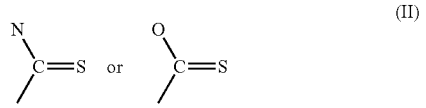

Further, a compound, which can form a thiocarbonyl group-containing compound in an aqueous solution, or in the presence of acid or alkali, can also be used. Examples of the above-mentioned thiocarbonyl compound include thiourea and derivatives thereof expressed by the following formula (III):

for example, methylthiourea, dimethylthiourea, trimethylthiourea, ethylthiourea, diethylthiourea, 1,3-dibutylthiourea, phenylthiourea, diphenylthiourea, 1,3-bis(dimethylaminopropyl)-2-thiourea, ethylenethiourea, and propylenethiourea.

Further, the above-mentioned thiocarbonyl compound includes carbothioic acids and salts thereof expressed by the following formula (IV):

for example, thioacetic acid, thiobenzoic acid, dithioacetic acid, sodium methyldithiocarbamate, sodium dimethyldithiocarbamate, triethylamine dimethyldithiocarbamate, sodium diethyldithiocarbamate, piperidine pentamethylenedithiocarbamate, pipecoline pipecolildithiocarbamate, and potassium o-ethylxanthogenate.

These thiocarbonyl compounds may be used alone or in combination of two or more species thereof. Further, among these thiocarbonyl compounds, a thiocarbonyl compound being not dissolved in water can be mixed into a coating agent to be used by adding after dissolving it with an alkali solution once.

The above-mentioned niobium oxide is preferably a niobium oxide colloidal particle. Thereby, a coat formed by compounding niobium oxide colloidal particles can be formed and the corrosion resistance can be more improved. When the average particle diameter of the above niobium oxide colloidal particles is smaller, it is more preferred because a more stable and compact coat containing niobium oxide is formed and therefore it is possible to stably provide a rust preventing property for a substrate to be treated.

The above-mentioned niobium oxide colloidal particles refers to particles in which the oxide of niobium is dispersed in a state of a fine particle in water, and these colloidal particles may be, for example, such particles that strictly speaking, niobium oxide is not formed and particles become an amorphous state in an intermediate state between niobium hydroxide and niobium oxide.

As a niobium oxide particle added to the water-borne coating agent to be used for forming the composite coat, niobium oxide sol produced by a publicly known method can be used. The above-mentioned niobium oxide sol is not particularly limited and includes, for example, niobium oxide sol produced by publicly known methods described in Japanese Kokai Publication Hei6-321543, Japanese Kokai Publication Hei8-143314, and Japanese Kokai Publication Hei8-325018. And, niobium oxide sol, which is commercially available from Taki Chemical Co., Ltd., can also be employed.

The above-mentioned niobium oxide colloidal particles preferably have an average particle diameter of 100 nm or less. The above average particle diameter is more preferably 2 to 50 nm, and furthermore preferably 2 to 20 nm. When the above average particle diameter is smaller, it is more preferred because a more stable and compact coat containing niobium oxide is formed and therefore it is possible to stably provide a rust preventing property for a substrate to be treated. The average particle diameter of the above-mentioned niobium oxide colloidal particles can be measured with a particle size measuring apparatus based on a dynamic light scattering method, e.g., FPAR-1000 (manufactured by OTSUKA ELECTRONICS CO., LTD.).

The above-mentioned guanidine compound is expressed by the following formula (2):

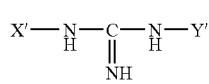

(2)

wherein X' and Y' are the same or different from each other, and represent H, $NH_2$, a phenyl group or a methylphenyl group (a tolyl group), or optionally have H, $NH_2$, a phenyl group or a methylphenyl group (a tolyl group) as a substituent and contain —C(=NH)—, —CO— or —CS—.

Examples of the above guanidine compound include guanidine, aminoguanidine, guanylthiourea, 1,3-di-o-tolylguanidine, 1-o-tolylbiguanide, and 1,3-diphenylguanidine. The above-mentioned guanidine compounds may be used alone or in combination of two or more species thereof.

In the above composite coat, an amount of the above silicon oxide particle (B) is preferably 5 to 100% by mass with respect to that of the above resin particle (A). When this amount is less than 5% by mass, the hardness and the corrosion resistance of a coat formed on the surface of a steel material may be deteriorated. When the amount is more than 100% by mass, the film forming property and the water resistance of a coat may be deteriorated. This amount is more preferably 10 to 50% by mass.

In the above composite coat, the content of a titanium atom is preferably 0.05 to 3% by mass with respect to 100% by mass of the total amount of a coat. When the content of the titanium atom is less than 0.05% by mass, compounding of the respective components in a coat formed is insufficient, and therefore the performance of the coat may be deteriorated. When this content is more than 3% by mass, the affinity for water of the coat becomes too large, and therefore the performance of the coat may be deteriorated or the bath stability of a water-borne coating agent to be used may be deteriorated. The content of the titanium atom is more preferably 0.2 to 2% by mass.

When the above composite coat contains a phosphate compound, the content of the above phosphate radical is preferably 0.01 to 5% by mass in 100% by mass of the coat. When the content of the phosphate radical is less than 0.01% by mass, corrosion resistance becomes insufficient, and when the content is more than 5% by mass, in some water-borne dispersion resins to be used, the water dispersion may gelate and it may become impossible to apply the water dispersion. The content of the phosphate radical is more preferably 0.05 to 3% by mass.

When the above composite coat contains a thiocarbonyl compound, the content of the above thiocarbonyl compound is preferably 0.01 to 5% by mass in 100% by mass of the coat. When the content of the thiocarbonyl compound is less than 0.01% by mass, corrosion resistance becomes insufficient, and when the content is more than 5% by mass, not only it is economically disadvantageous since a degree of the corrosion resistance is saturated, but also in some water-borne dispersion resins to be used, the water dispersion may gelate and it may become impossible to apply the water dispersion. The content of the thiocarbonyl compound is more preferably 0.05 to 5% by mass.

When the above composite coat contains niobium oxide, the content of the above niobium oxide is preferably 0.01 to 5% by mass on the $Nb_2O_5$ equivalent basis in 100% by mass of the coat. When the content of the niobium oxide is less than 0.01% by mass, undesirably, an adequate rust preventing property cannot be attained, and when the content is more than 5% by mass, it may be economically disadvantageous since there is no increase in a rust-preventive effect. The content of the niobium oxide is more preferably 0.05 to 3% by mass.

When the above composite coat contains a guanidine compound, the content of the above guanidine compound is preferably 0.01 to 5% by mass in 100% by mass of the coat. When the content of the guanidine compound is less than 0.01% by mass, corrosion resistance becomes insufficient, and when the content is more than 5% by mass, not only it is economically disadvantageous since a degree of the corrosion resistance is saturated, but also in some water-borne dispersion resins to be used, the water dispersion may gelate and it may become impossible to apply the water dispersion. The content of the guanidine compound is more preferably 0.05 to 3% by mass.

Another component other than the above substances (A) to (D) may be contained in the above composite coat. For example, a lubricant or pigment may be mixed. As the above-mentioned lubricant, publicly known lubricants such as a fluorine-based lubricant, a hydrocarbon-based lubricant, a fatty acid amide-based lubricant, an ester lubricant, an alcoholic lubricant, a metal soap lubricant and inorganic lubricant can be used. As the above-mentioned pigment, various coloring pigments like inorganic pigments such as titanium oxide ($TiO_2$), zinc oxide (ZnO), calcium carbonate ($CaCO_3$), barium sulfate ($BaSO_4$), alumina ($Al_2O_3$), kaolin clay, carbon black, iron oxides ($Fe_2O_3$, $Fe_3O_4$) and the like, and like organic pigments can be used.

The above composite coat can be formed by treating the surface of a substrate with a coating agent for steel materials containing components required for forming a coat. The above-mentioned coating agent for steel materials is preferably water-borne. A particularly preferred form of the above-mentioned water-borne coating agent for steel materials includes, for example, a coating agent in which the resin particles (A) obtained by reacting a water dispersion of the neutralized product of the above ethylene-unsaturated carboxylic acid copolymer with a silane compound and an epoxy compound to be used as required, the silicon oxide particles (B), the organic titanium compound (C), and at least one species, which are used as required, selected from the group consisting of phosphate compounds, thiocarbonyl compounds, niobium oxide and guanidine compounds are mixed. The water-borne coating agent for steel materials of this case may be one in which these components are mixed, and the order of adding these components is not particularly limited. The water-borne coating agent for steel materials can be produced by following, for example, the procedure (1) described below.

(1) The above-mentioned water dispersion of the neutralized product of the ethylene-unsaturated carboxylic acid copolymerization resin is appropriately heated to raise a temperature while stirring, and to this, a silane compound and an epoxy compound to be used as required are added to react these compounds with the above water dispersion to obtain resin particles (A), and the resulting resin particles (A) is mixed with the silicon oxide particles (B) and the organic titanium compound (C) to prepare a water-borne composition, and further into this, at least one compound (D) selected from the group consisting of phosphate compounds, thiocarbonyl compounds, niobium oxide and guanidine compounds is mixed as required.

A solvent or a leveling agent may be used in the above water-borne coating agent for steel materials in order to form a more uniform and smooth coat. The solvent for this is not particularly limited as long as it is a solvent generally used in coating compositions and includes, for example, hydrophilic solvents such as an alcohol solvent, a ketone solvent, an ester solvent, an ether solvent and the like, and leveling agents such as a silicone leveling agent and the like.

The formation of the composite coat by the above water-borne coating agent for steel materials can be carried out by applying the above water-borne coating agent for steel materials onto the surface of a steel material. For example, in order to coat a zinc-coated steel material or an uncoated steel material, the above water-borne coating agent for steel materials is applied to a substance to be coated, which has been subjected to degreasing as required. A method of applying the water-borne coating agent for steel materials is not particularly limited and a roller coating method, an air spray method, an airless spray method or an immersion method, which is usually used, can be appropriately adopted. It is preferred to heat the substance to be coated in advance or to dry the substance to be coated by heating after applying in order to enhance the curability of a coat. A heating temperature of the substance to be coated is 50 to 250° C., preferably 100 to 220° C. When the heating temperature is lower than 50° C., an evaporation rate of water is low and an adequate film forming property cannot be attained, and therefore the solvent resistance and the alkali resistance of a composite coat are deteriorated. On the other hand, when the heating temperature is higher than 250° C., the thermal decomposition of resin occurs and therefore the solvent resistance and the alkali resistance of a composite coat are deteriorated and the appearance of a composite coat is degraded due to yellowing. When the water-borne coating agent for steel materials is dried by heating after applying it, a drying time is preferably 1 second to 5 minutes.

In the above coated steel sheet, an amount of the coat of the above composite coat is 0.5 to 3 g/m². When the above-mentioned amount of the coat is less than 0.5 g/m², a problem of the deterioration of corrosion resistance arises. When the above-mentioned amount of the coat is more than 3 g/m², a problem of the deterioration of an adhesion property to a substrate arises.

And, the coated steel sheet of the present invention can also be used in a state in which a coating film is formed by applying a finishing paint onto the above composite coat. The finishing paint includes, for example, coating compositions consist of an acrylic resin, an acrylic modified alkyd resin, an epoxy resin, an urethane resin, a melamine resin, a phthalic resin, an amino resin, a polyester resin or a vinyl chloride resin.

A film thickness of the coating film of the finishing paint is appropriately determined in accordance with the uses of anti-corrosive metal products or the species of a finishing paint to be used and is not particularly limited. This film thickness is usually about 5 to 300 μm, more preferably about 10 to 200 μm. The coating film of the finishing paint can be formed by applying a finishing paint onto a coat formed by applying the above water-borne coating agent for steel materials, and drying and curing the applied finishing paint by heating. A drying temperature and a drying time are appropriately adjusted in accordance with the species of a finishing paint to be applied or the film thickness of a coating film, and generally the drying temperature is preferably 50 to 250° C. and the drying time is preferably 5 minutes to 1 hour. The application of the finishing paint can be performed by publicly known methods in accordance with the form of the finishing paint.

As the steel material in the present invention, there may be mentioned, for example, zinc-based plated steel sheets such as a galvanized steel sheet, a zinc-nickel-plated steel sheet, a zinc-iron-plated steel sheet, a zinc-chromium-plated steel sheet, a zinc-aluminum-plated steel sheet, a zinc-titanium-plated steel sheet, a zinc-magnesium-plated steel sheet, a zinc-manganese-plated steel sheet, a zinc-aluminum-magnesium-plated steel sheet and a zinc-aluminum-magnesium-silicon-plated steel sheet, and further plated steel sheets formed by including a small amount of cobalt, molybdenum, tungsten, nickel, titanium, chromium aluminum, manganese, iron, magnesium, lead, bismuth, antimony, tin, copper, cadmium and arsenic as a heterogeneous metal element or an impurity in a plating layer of each of these zinc-based plated steel sheets and by dispersing inorganic substances such as silica, alumina, titania and the like similarly in a plating layer of each of these zinc-based plated steel sheets. Further, the composite coat of the present invention can also be applied to the plating of a multiple layer formed by combining the plating described above with another kinds of plating such as iron plating, iron-phosphorus plating, nickel plating and cobalt plating. Further, it can also be applied to aluminum or aluminum alloy plating. A method of plating is not particularly limited and any method of the publicly known electroplating method, hot-dipping method, evaporation coating method, dispersion plating method and vacuum deposition method may be employed.

The above-mentioned coated steel sheet, of which a coat is formed by applying the above water-borne coating agent for steel materials onto the surface of a steel material, is provided with corrosion resistance, an adhesion property to a substrate, solvent resistance, alkali resistance and press oil resistance, and in the coated steel sheet on which a coating film is formed by further applying the finishing paint, the coat formed on the steel sheet has an excellent adhesion to the coating film of the finishing paint.

Effect of the Invention

In accordance with the present invention, a coated steel sheet having an organic-inorganic composite coat, which is superior in the adhesion property to a substrate and the press oil resistance, is obtained without impairing corrosion resistance, solvent resistance, alkali resistance and an adhesion property to a paint.

BEST MODE FOR CARRYING OUT THE INVENTION

Next, the present invention will be described more specifically by way of Production Examples of a water-borne dispersion resin, Examples and Comparative Examples. In addition, all of "%" of a concentration unit refers to "% by mass" in the following descriptions.

Production Example of Resin Particle (A-1)

In a reaction vessel, an ethylene-methacrylic acid copolymerization resin (the content of methacrylic acid was 18%) was put, and to this, sodium hydroxide in an amount of 5% with respect to the amount of the above copolymerization resin and deionized water were added, and the resulting mixture was stirred at 95° C. for 6 hours to obtain a water dispersion of resin having a solid content of 20%. To this water dispersion of resin, pentaerythritol polyglycidyl ether in an amount of 0.4% and γ-glycidoxypropyltrimethoxysilane in an amount of 1.2% were further added, and the resulting mixture was reacted at 85° C. for 2 hours to obtain a water dispersion of a resin particle (A-1) having a solid content of 21% and a silanol group and/or an methoxysilyl group. An average particle diameter of the resin particles (A-1), measured by a particle size measuring apparatus based on a dynamic light scattering method, FPAR-1000 (manufactured by OTSUKA ELECTRONICS CO., LTD.), was 72 nm.

Production Example of Resin Particle (A-2)

In a reaction vessel, an ethylene-methacrylic acid copolymerization resin (the content of methacrylic acid was 20%) was put, and to this, sodium hydroxide in an amount of 3.7%, a 25% ammonia water (concentration 25%) in an amount of 6.3% with respect to the amount of the above copolymerization resin, and deionized water were added, and the resulting mixture was stirred at 95° C. for 6 hours to obtain a water dispersion of resin having a solid content of 20%. To this water dispersion of resin, pentaerythritol polyglycidyl ether in an amount of 0.6% and γ-glycidoxypropyltriethoxysilane in an amount of 1.2% were further added, and the resulting mixture was reacted at 85° C. for 2 hours to obtain a water dispersion of a resin particle (A-2) having a solid content of 21% and a silanol group and/or an ethoxysilyl group. An average particle diameter of the resin particles (A-2), measured in the same manner as that described above, was 84 nm.

Production Example of Resin Particle (A-3)

In a reaction vessel, an ethylene-methacrylic acid copolymerization resin (the content of methacrylic acid was 20%) was put, and to this, sodium hydroxide in an amount of 5.6% with respect to the amount of the above copolymerization resin and deionized water were added, and the resulting mixture was stirred at 95° C. for 6 hours to obtain a water dispersion of resin having a solid content of 20%. To this water dispersion of resin, glycerol polyglycidyl ether in an amount of 0.8% and γ-glycidoxypropyltrimethoxysilane in an amount of 0.8% were further added, and the resulting mixture was reacted at 85° C. for 2 hours to obtain a water dispersion of a resin particle (A-3) having a solid content of 21% and a silanol group and/or an methoxysilyl group. An average particle diameter of the resin particles (A-3), measured in the same manner as that described above, was 76 nm.

Production Example of Resin Particle (A-4)

In a reaction vessel, an ethylene-methacrylic acid copolymerization resin (the content of methacrylic acid was 20%) was put, and to this, sodium hydroxide in an amount of 5.6% with respect to the amount of the above copolymerization resin and deionized water were added, and the resulting mixture was stirred at 95° C. for 2 hours to obtain a water dispersion of resin having a solid content of 20%. To this water dispersion of resin, glycerol polyglycidyl ether in an amount of 0.8% and γ-glycidoxypropyltrimethoxysilane in an amount of 0.8% were further added, and the resulting mixture was reacted at 85° C. for 2 hours to obtain a water dispersion of a resin particle (A-4) having a solid content of 21% and a silanol group and/or an methoxysilyl group. An average particle diameter of the resin particles (A-4), measured in the same manner as that described above, was 128 nm.

Production Example of Resin Particle (A-5)

In a reaction vessel, an ethylene-methacrylic acid copolymerization resin (the content of methacrylic acid was 20%) was put, and to this, an ammonia water (concentration 25%) in an amount of 15.8% with respect to the amount of the above copolymerization resin and deionized water were added, and the resulting mixture was stirred at 95° C. for 2 hours to obtain a water dispersion of resin having a solid content of 20%. To this water dispersion of resin, hydrogenated bisphenol A diglycidyl ether in an amount of 1.2% and γ-glycidoxypropyltrimethoxysilane in an amount of 1.2% were further added, and the resulting mixture was reacted at 85° C. for 2 hours to obtain a water dispersion of a resin particle (A-5) having a solid content of 21% and a silanol group and/or an methoxysilyl group. An average particle diameter of the resin particles (A-5), measured in the same manner as that described above, was 145 nm.

Production Example of Resin Particle (A-6)

A 2% aqueous solution of sodium lauryl sulfate was put in a reaction vessel and kept at 80° C., and into this, ammonium persulfate was charged so as to be 0.3% with respect to the above-mentioned 2% aqueous solution. Immediately after this, the dropwise addition of an unsaturated monomer mixture composed of styrene, methyl methacrylate, 2-ethylhexyl acrylate, methacrylic acid and γ-methacryloxypropyltrimethoxysilane in proportions of 30:34:30:2:4 (mass ratio) was started and all of the unsaturated monomer mixture was equally charged over 2 hours. The resulting mixture was stirred for 1 hour at an as-is temperature, cooled, and adjusted to pH 8 with ammonia water to obtain a water dispersion of a resin particle (A-6) having a solid content of 21% and a silanol group and/or an methoxysilyl group. An average particle diameter of the resin particles (A-6), measured in the same manner as that described above, was 80 nm.

Example 1

Preparation of Water-Borne Coating Agent

Into a water dispersion of the above resin particle (A-1), a water dispersion of silicon oxide having an average particle diameter of 15 nm, dipropylbis(triethanolaminato)titanium, diammonium hydrogen phosphate, and thiourea were mixed in succession according to the formulation shown in Table 1 to prepare a water-borne composition having a solid content of 18%.

Preparation of Test Sheet

An electrogalvanized steel sheet (quantity of zinc deposited: 20 g/m$^2$) of 0.8 mm in thickness was degreased at 60° C. for 2 minutes by spraying a 2% aqueous solution of an alkaline degreasing agent (SURF CLEANER 155 produced by Nippon Paint Co., Ltd.), rinsed with water and dried with warm-air. After cooling the degreased electrogalvanized steel sheet, the above water-based coating material was applied to this steel sheet with a bar coater in such a manner that an amount of a dried coating was 1 g/m$^2$ and the steel sheet was baked in a hot-air oven having an ambient temperature of 500° C. until a temperature of the steel sheet reached 180° C. and test sheets were prepared.

Evaluation Method

Corrosion resistance, an adhesion property to a substrate, solvent resistance, alkali resistance, press oil resistance and an adhesion property to a paint were evaluated. The evaluations were carried out according to the following criteria and the results of evaluations are shown in Table 1.

<Corrosion Resistance>

Edges and a backside of the test sheet were sealed with tapes and 5% salt water was sprayed onto the test sheet at 35° C. and a rate of area where white rust is produced after a lapse of 120 hours was rated according to the following criteria.

⊚: White rust is not produced

○: Rate of area of white rust produced is less than 10%

Δ: Rate of area of white rust produced is at least 10% and less than 30%

X: Rate of area of white rust produced is at least 30%

<Adhesion Property to Substrate>

A test sheet after a lapse of 1 hour or less from coating was extruded by 8 mm by an Erichsen tester, Cellotape (Registered Trademark) (produced by NICHIBAN CO., LTD.) was stuck to an extruded portion and then peeled forcibly. A state of a coating after peeling the Cellotape (Registered Trademark) was rated according to the following criteria.

◎: Not peeled
○: Slightly peeled
Δ: Partially peeled
X: Fully peeled

<Solvent Resistance>

The test sheet was set on a rubbing tester and traced to and from ten times with a load of 0.5 Kgf/cm² being applied with absorbent cotton impregnated with ethanol and fifty times with a load of 0.5 Kgf/cm² being applied with absorbent cotton impregnated with kerosene. A state of a coat after scraping was rated according to the following criteria.

◎: No trace on the traced face
○: A few traces on the traced face
Δ: White traces on the traced face
X: A coat is traced off the traced face <Alkali Resistance>

A test sheet made immediately after the preparation of the water-borne coating agent and a test sheet made after a lapse of 10 days from the preparation of the water-borne coating agent were immersed in a 2% aqueous solution of an alkaline degreasing agent (SURF CLEANER 53 produced by Nippon Paint Co., Ltd.) of 55° C. for 30 minutes while stirring the aqueous solution. A state of a coat after the immersion was rated according to the following criteria.

◎: Not peeled
○: Slightly peeled
Δ: Partially peeled
X: Fully peeled

<Press Oil Resistance>

The test sheet was immersed in a press oil (G6318SK produced by NIHON KOHSAKUYU CO., LTD.) at room temperature for 24 hours. A state of a coat after the immersion was rated according to the following criteria.

◎: Not changed in color
○: Slightly changed in color
Δ: Uneven coat
X: Peeled

<Adhesion Property of Coat>

A melamine alkyd coating material (Superlac 100 produced by Nippon Paint Co., Ltd.) was applied onto the surface of the test sheet with a bar coater in such a manner that a dried film thickness was 20 μm and the steel sheet was baked at 120° C. for 25 minutes to prepare a coated plate. Next, the coated plate was immersed in boiled water for 30 minutes and left standing for 24 hours. Then, the coated plate was extruded by 7 mm by an Erichsen tester and Cellotape (Registered Trademark) (produced by NICHIBAN CO., LTD.) was stuck to an extruded portion and then peeled forcibly. A state of a coating film after peeling the Cellotape (Registered Trademark) was rated according to the following criteria.

◎: Not peeled
○: Slightly peeled
Δ: Partially peeled
X: Fully peeled

Examples 2 to 9, Comparative Examples 1 to 3

Test sheets were prepared and evaluated by following the same procedure as in Example 1 except for changing the formulations of the water-borne coating agents to the values described in Table 1. The results of evaluations are shown in Table 1.

TABLE 1

| | | | Examples | | | | | | | | Comparative Examples | | |
| --- | --- | --- | --- | --- | --- | --- | --- | --- | --- | --- | --- | --- | --- |
| | | | 1 | 2 | 3 | 4 | 6 | 6 | 7 | 8 | 9 | 1 | 2 | 3 |
| Formulation of coating agent | (A) | Resin particle | (A-1) 70 | (A-1) 70 | (A-1) 70 | (A-2) 77 | (A-2) 77 | (A-2) 77 | (A-3) 75 | (A-3) 75 | (A-3) 75 | (A-4) 75 | (A-5) 70 | (A-6) 77 |
| | (B) | Silicon oxide | 30 | 30 | 30 | 23 | 23 | 23 | 25 | 25 | 25 | 25 | 30 | 23 |
| | (C) | Organic titanium compound [1] (as a Ti atom) | 1 | 1 | 1 | 0.5 | 0.5 | 0.5 | 1 | 1 | 1 | 1 | 1 | 0.5 |
| | (D) | Phosphate compound [2] (as a phosphate radical) | 0.5 | 0.5 | 0.5 | 1.5 | 1.5 | 1.5 | 0.5 | 0.5 | 0.5 | 0.5 | 1 | 0.5 |
| | | Thiourea | 2.5 | | | 2.5 | | | 2.5 | | | 2.5 | | |
| | | Sodium dimethyldithiocarbamate | | 2.5 | | | | | | | | | | |
| | | Niobium oxide | | | 1 | | 1 | | | 1 | | | 1 | |
| | | Guanylthiourea | | | | | | 1 | | | | | | |
| | | 1-o-tolylbiguanide | | | | | | | | | 1 | | | 1 |
| Performance of coated steel sheet | | Adhesion property to substrate | ◎ | ◎ | ◎ | ○ | ○ | ○ | ◎ | ◎ | ◎ | Δ | Δ | X |
| | | Corrosion resistance | ◎ | ◎ | ◎ | ◎ | ◎ | ◎ | ◎ | ◎ | ◎ | ○ | ○ | Δ |
| | | Solvent  ethanol | ◎ | ◎ | ◎ | ◎ | ◎ | ◎ | ◎ | ◎ | ◎ | ◎ | ◎ | Δ |
| | | resistance  kerosene | ○ | ○ | ○ | ◎ | ◎ | ◎ | ◎ | ◎ | ◎ | ○ | Δ | ○ |
| | | Alkali resistance | ◎ | ◎ | ◎ | ◎ | ◎ | ◎ | ◎ | ◎ | ◎ | ◎ | ◎ | Δ |
| | | Press oil resistance | ◎ | ◎ | ◎ | ◎ | ◎ | ◎ | ○ | ○ | ○ | Δ | X | ○ |
| | | Adhesion property to paint | ◎ | ◎ | ◎ | ◎ | ◎ | ◎ | ◎ | ◎ | ◎ | ○ | Δ | ○ |

[1] dipropoxybis(triethanolaminato)titanium
[2] diammonium hydrogen phosphate

Examples 10 to 18, Comparative Examples 4 to 6

Test sheets of Examples 10 to 18 and Comparative Examples 4 to 6 were prepared and evaluated by using the same water-based coating materials as in Examples 1 to 9 and Comparative Examples 1 to 3, respectively, as described in Table 2 and following the same procedures as in Examples 1 to 9 and Comparative Examples 1 to 3, respectively, except for changing the raw steel sheet to be used in the test from the electrogalvanized steel sheet to a hot-dip galvanized steel sheet (quantity of zinc deposited: 60 g/m²) of 0.8 mm in thickness. The results of evaluations are shown in Table 2.

TABLE 2

|  |  | Examples | | | | | | | | | Comparative Examples | | |
|---|---|---|---|---|---|---|---|---|---|---|---|---|---|
|  |  | 10 | 11 | 12 | 13 | 14 | 15 | 16 | 17 | 18 | 4 | 5 | 6 |
| Formulation of coating agent | (A) Resin particle | (A-1) 70 | (A-1) 70 | (A-1) 70 | (A-2) 77 | (A-2) 77 | (A-2) 77 | (A-3) 75 | (A-3) 75 | (A-3) 75 | (A-4) 75 | (A-5) 70 | (A-6) 77 |
|  | (B) Silicon oxide | 30 | 30 | 30 | 23 | 23 | 23 | 25 | 25 | 25 | 25 | 30 | 23 |
|  | (C) Organic titanium compound [1] (as a Ti atom) | 1 | 1 | 1 | 0.5 | 0.5 | 0.5 | 1 | 1 | 1 | 1 | 1 | 0.5 |
|  | (D) Phosphate compound [2] (as a phosphate radical) | 0.5 | 0.5 | 0.5 | 1.5 | 1.5 | 1.5 | 0.5 | 0.5 | 0.5 | 0.5 | 1 | 0.5 |
|  | Thiourea | 2.5 |  |  | 2.5 |  |  | 2.5 |  |  | 2.5 |  |  |
|  | Sodium dimethyldithiocarbamate |  | 2.5 |  |  |  |  |  |  |  |  |  |  |
|  | Niobium oxide |  |  | 1 |  | 1 |  |  | 1 |  |  | 1 |  |
|  | Guanylthiourea |  |  |  |  |  | 1 |  |  |  |  |  |  |
|  | 1-o-tolylbiguanide |  |  |  |  |  |  |  |  | 1 |  |  | 1 |
| Performance of coated steel sheet | Adhesion property to substrate | ◎ | ◎ | ◎ | ○ | ○ | ○ | ◎ | ◎ | ◎ | Δ | Δ | X |
|  | Corrosion resistance | ◎ | ◎ | ◎ | ◎ | ◎ | ◎ | ◎ | ◎ | ◎ | ○ | ○ | Δ |
|  | Solvent resistance — ethanol | ◎ | ◎ | ◎ | ◎ | ◎ | ◎ | ◎ | ◎ | ◎ | ◎ | ◎ | Δ |
|  | Solvent resistance — kerosene | ○ | ○ | ○ | ◎ | ◎ | ◎ | ◎ | ◎ | ◎ | ○ | Δ | ○ |
|  | Alkali resistance | ◎ | ◎ | ◎ | ◎ | ◎ | ◎ | ◎ | ◎ | ◎ | ◎ | ◎ | Δ |
|  | Press oil resistance | ◎ | ◎ | ◎ | ◎ | ◎ | ◎ | ○ | ○ | ○ | Δ | X | ○ |
|  | Adhesion property to paint | ◎ | ◎ | ◎ | ◎ | ◎ | ◎ | ◎ | ◎ | ◎ | ○ | Δ | ○ |

[1] dipropoxybis(triethanolaminato)titanium
[2] diammonium hydrogen phosphate

From the results of the above Examples, it has become evident that the coated steel sheet of the present invention has excellent properties in corrosion resistance, an adhesion property to a substrate, solvent resistance, alkali resistance, press oil resistance and an adhesion property to a paint.

INDUSTRIAL APPLICABILITY

The coated steel sheet of the present invention can be suitably used for automobiles, household electrical appliances, construction materials and the like.

The invention claimed is:

1. A coated steel sheet coated with a composite coat, wherein said composite coat is a coat formed by compounding
ethylene-unsaturated carboxylic acid copolymerization resin particles (A) having an average particle diameter of 20 to 100 nm and a silanol group and/or an alkoxysilyl group, which is obtained by reacting a water dispersion of ethylene-unsaturated carboxylic acid copolymerization resin particles with an epoxy group-containing silane compound,
silicon oxide particles (B) having an average particle diameter of 5 to 50 nm,
an organic titanium compound (C),
a phosphate compound, and
at least one compound (D) selected from the group consisting of a thiocarbonyl compound, a niobium oxide and a guanidine compound,
wherein an amount of a coat of said composite coat is 0.5 to 3 g/m$^2$.

2. The coated steel sheet according to claim 1, wherein in the composite coat, an amount of the silicon oxide particle (B) is 5 to 100% by mass with respect to that of the resin particle (A) and the content of a titanium atom is 0.05 to 3% by mass with respect to the total amount of a coat.

3. The coated steel sheet according to claim 1, wherein the resin particle (A) comprises an ethylene-methacrylic acid copolymerization resin.

4. The coated steel sheet according to claim 2, wherein the resin particle (A) comprises an ethylene-methacrylic acid copolymerization resin.

* * * * *